(12) United States Patent
Picraux et al.

(10) Patent No.: US 6,708,260 B2
(45) Date of Patent: Mar. 16, 2004

(54) MANAGING DATA IN A QUEUE

(75) Inventors: Jeanine Picraux, San Jose, CA (US); Shinichi Kawaguchi, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 187 days.

(21) Appl. No.: 10/098,049

(22) Filed: Mar. 14, 2002

(65) Prior Publication Data

US 2003/0177318 A1 Sep. 18, 2003

(51) Int. Cl.⁷ .................................................. G06F 12/08
(52) U.S. Cl. ........................ 711/154; 711/157; 711/150; 710/56
(58) Field of Search ................... 711/173, 157, 711/154, 150; 710/56

(56) References Cited

U.S. PATENT DOCUMENTS 4,674,032 A * 6/1987 Michaelson ................. 711/169

* cited by examiner

Primary Examiner—Mano Padmanabhan
Assistant Examiner—Midys Inoa
(74) Attorney, Agent, or Firm—Tuan V. Ngo

(57) ABSTRACT

The present invention, in various embodiments, provides techniques for managing data in a queue. In one embodiment, two write pointers control writing into a memory queue and one read pointer control reading from the queue. Individual entries written into the queue may complete out-of-order and depend on various conditions such as whether the pointer associated with the entries is active or passive, whether the other pointer is tracking a transaction, whether the active pointer is lower, equal to, or higher than the inactive pointer, whether the data is the last piece of data in a transaction, etc. Data read from the queue is in the order of the transaction headers written into the queue. The data may bypass the queue, i.e., the data is not written into the queue, but is loaded directly to an output register.

21 Claims, 7 Drawing Sheets

| CYCLE | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| DATA PIECES | 1-1 | 2-1 | 1-2 | 2-2 | 1-3 | . | 1-4 | . | 3-1 | 4-1 | 3-2 | . | . | 3-3 |
| CHANNEL | A | B | A | B | A | B | A | B | A | B | A | B | A | A |

MANAGING DATA IN A QUEUE

FIELD OF THE INVENTION

The present invention relates generally to managing data and, more specifically, to managing data in a queue.

BACKGROUND OF THE INVENTION

Commonly, pointers and registers keep track of the next available write location in a memory queue. However, various current queue mechanisms including first-in first-out (FIFO) queues experience disadvantages, such as using too many pointers and/or registers, allowing the data to be written only sequentially, etc. Therefore, it is desirable that mechanisms be provided to solve the above deficiencies and related problems.

SUMMARY OF THE INVENTION

The present invention, in various embodiments, provides techniques for managing data in a queue. In one embodiment, two write pointers control writing into a memory queue and one read pointer control reading from the queue. Individual entries written into the queue may complete out-of-order and depend on various conditions such as whether the pointer associated with the entries is active or passive, whether the other pointer is tracking a transaction, whether the active pointer is lower, equal to, or higher than the inactive pointer, whether the data is the last data piece of a transaction, etc. Data read from the queue is in the order of the transaction headers written into the queue. The data may bypass the queue, i.e., the data is not written into the queue, but is loaded directly to an output register.

BRIEF DESCRIPTION OF THE DRAWINGS

The present invention is illustrated by way of example, and not by way of limitation, in the figures of the accompanying drawings in which like reference numerals refer to similar elements and in which:

FIG. 2B illustrates how the data in FIG. 2A may arrive at the queue in FIG. 1, in accordance with one embodiment;

DETAILED DESCRIPTION OF THE PREFERRED EMBODIMENT

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

System Overview

Figure 1:
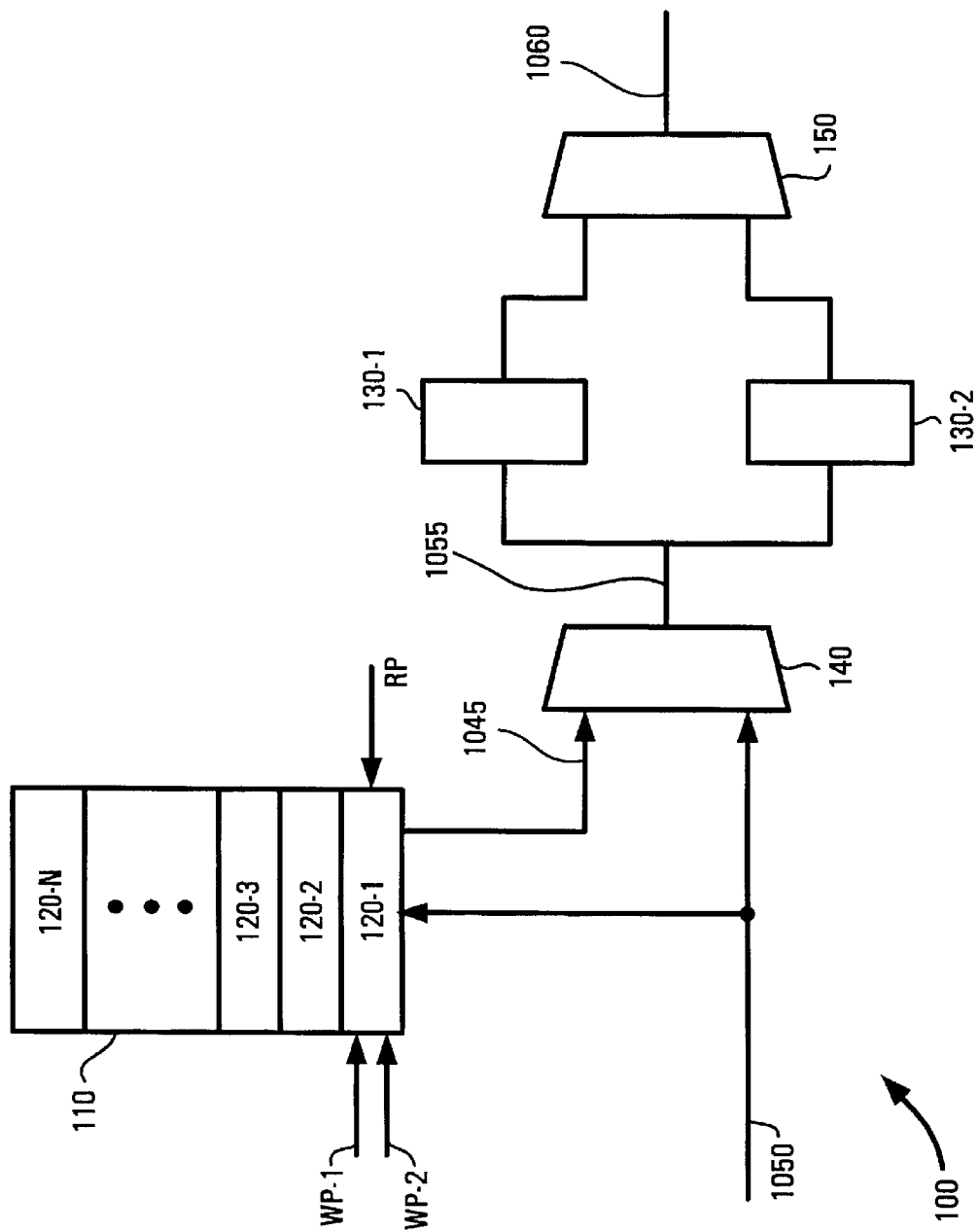
FIG. 1 shows a queue mechanism in accordance with one embodiment.

FIG. 1 shows a system 100 in accordance with one embodiment. System 100 includes a queue 110, two write pointers WP-1 and WP-2, one read pointer RP, two output registers 130-1 and 130-2, and two multiplexers (MUX) 140 and 150. System 100 may be used in various applications such as buffering, moving, and switching data between chips, devices, and systems in networking, multi-processor applications, etc., and their equivalences.

Queue 110 includes locations 120-1, 120-2, ... 120-N for N locations. In one embodiment, queue 110 is circular, i.e., when the last location, e.g., location 120-N, is occupied, subsequent transaction data is stored in location 120-1, 120-2, 120-3, etc. For illustration purposes, each time queue 110 is full or circular, the suffix name for each location in queue 110 is incremented by a number N. For example, location 120-1 is considered location 120-(N+1), location 120-(2N+1), and location 120-(3N+1) for the first circular, the second circular, and the third circular, respectively; location 120-2 is considered location 120-(N+2), location 120-(2N+2), and location 120-(3N+2) for the first circular, the second circular, and the third circular, respectively, etc. A location having a higher number is "higher" than a location having a lower number, e.g., location 120-2 is higher than location 120-1, location 120-3 is higher than location 120-2, etc. However, when queue 110 is circular, location 120-1 is higher than location 120-N because in this situation, as described above, location 120-1 is considered location 120(N+1). In this FIG. 1 example, locations 120 are shown as physically consecutive, but they can be logically consecutive, i.e., each logical location corresponds to a physical location resided at different places.

Output registers 130 store data for outputting to line 1060. In one embodiment, in a cycle, only one register 130 is active while the other register 130 is inactive. For example, if register 130-1 is active, then register 130-2 is inactive and vice versa. The active register, if available, stores the data on line 1055, which is either read from queue 110 or bypasses queue 110. A register 130 is available for storing new data in a cycle if in that cycle that register is already empty or being cleared, i.e., the data stored in the register is being read. Every time an active register 130 receives new data, it switches to inactive, and the inactive register 130 switches to active.

Each register 130 is associated with a bypass indicator, a load indicator, and a clear indicator, which are commonly referred to as flags. The bypass flag, when asserted, indicates that the data received and thus stored in the corresponding register bypasses queue 110. In one embodiment, the bypass flag is asserted if the corresponding register 130 is active and available for storing data, the data is an one-element transaction, and queue 110 is empty. The load flag, when asserted, indicates that the data stored in the corresponding register 130 was received from queue 110, instead of being bypassed. Consequently, the load flag is asserted if the bypass flag is not asserted, the register 130 is active and available for storing data, and the transaction data was completely written in a location of queue 110. The clear flag, when asserted, indicates that the corresponding register is available for storing new data. The clear flag is asserted if the bypass and load flags are not asserted, and the register is the active register, and the first element of the associated transaction is read out of the register on the current cycle. In other words, if nothing new is being loaded and the current register contents are being removed, then the clear flag is asserted.

Mux 140 selects data from queue 110 on line 1045 or from line 1050, which carries data to be written into queue 110. If mux 140 selects data from line 1050, queue 110 is bypassed. Mux 150 selects data from either register 130-1 or 130-2 to be output on line 1060. Muxes 140 and 150 are used as an example only, any mechanism for selecting among the various inputs to an output may be used.

Write pointers WP identify the locations of queue 110 into which data is written. Read pointer RP identifies the locations of queue 110 from which data is read. A first pointer is "higher" than a second pointer if the first pointer points to a location higher than the location of the second pointer. Inversely, the first pointer is "lower" than the second pointer if the first pointer points to a lower location. Similarly, the first pointer is "equal to" the second pointer if both pointers point to the same location. For illustration purposes, initially or when queue 110 is reset, write pointers WP-1 and WP-2, and read pointer RP point to the same location 120-1. The term pointer is used for illustration purposes only, any identifier or mechanism can be used to identify locations for writing and reading from queue 110.

Data

In one embodiment, queue 110 receives a data stream on line 1050 in various cycles, e.g., from cycle 1 to cycle n. A data stream is commonly sent as a transaction and comprises a set of information arranged in various parts or pieces, which are logically consecutive but are not necessarily physically consecutive. That is, a part of the data may be sandwiched by some parts of one or more other streams. Consequently, the data may be referred to as "time interleave," and a transaction may not include data in one or some cycles in cycle 1 to cycle n. The first piece of a data transaction is received in the first cycle, e.g., cycle 1, and the last pieces of the data is received in the last cycle, e.g., cycle n. If the transaction has only one data piece, that data piece is received in one cycle, e.g., cycle 1.

In one embodiment, data streams or transactions arrive at queue 110 on line 1050 in channels. In a given cycle, a channel is either "active" or "inactive" in which an active channel indicates the data comes from that channel while an inactive channel indicates the data does not come from that channel. Further, there are two channels, e.g., a channel A and a channel B, which, generally, are alternately active. In a particular cycle, if there is a data piece, that data piece is associated with the channel active in that cycle. Once the data piece of a data stream is associated with a particular channel, the rest of the data pieces of that data stream is also associated with that same channel. A channel is not associated with a second data stream until the channel ends its association with a first data stream.

In one embodiment, a data stream can stall at any time. Further, as a particular data piece is stalled, the channel associated with that piece of data remains active until that data piece arrives. For example, in a two-channel system, e.g., with a channel A and a channel B and without stalling, and if A1, A2, A3, and A4 are data pieces of a first transaction, and B1, B2, and B3 are data pieces of a second transaction, then the data pieces arrive in alternating channels A B A B A B A corresponding to data pieces A1 B1 A2 B2 A3 B3 A4, etc. And for another example, if data piece A2 is stalled for one cycle, two cycles, and three cycles, then the sequence for active channels would be A B A A B A B A, A B A A A B A B A, and A B A A A A B A B A, respectively.

In one embodiment, the data received by and thus stored in queue 110 includes information corresponding to the data stored in other locations, and, from the information, the data may be identified. Exemplary information includes status, control, location, type, size, quality (e.g. whether data is good or bad), etc.

All data pieces pertaining to a transaction are stored on a transaction basis, e.g., in a queue location, regardless of the cycle on which a data piece is received. For example, a transaction may require five cycles to be fully received and thus require that the data received on those five cycles be fully stored. The transaction is completely written into queue 110 when all data pieces of the transaction are written into queue 110, which normally occurs when the last data piece is written into queue 110. Multiple data transactions may be in the process of being written into queue 110 even though one or more transaction is not completely written. The order of receiving headers or first data pieces of the transactions constitutes the order of the locations of queue 110 into which the data of the transactions are written, and thus the order to be read out from queue 110. In one embodiment, the first data piece of a transaction is first written in the lowest location, e.g., location 120-1, and the first data piece of subsequent transactions is written in higher locations. For example, the first data piece of the first transaction is written in location 120-1, the first data piece of the second transaction is written in location 120-2, and the first data piece of the third transaction is written in location 120-3, etc. Because transaction data varies in size and/or the data pieces arrive at different times, a transaction first received and referenced in queue 110 is not necessarily the first transaction completely written in queue 110.

Illustration of How Transaction Data is Stored in Queue 110

Figure 2A:
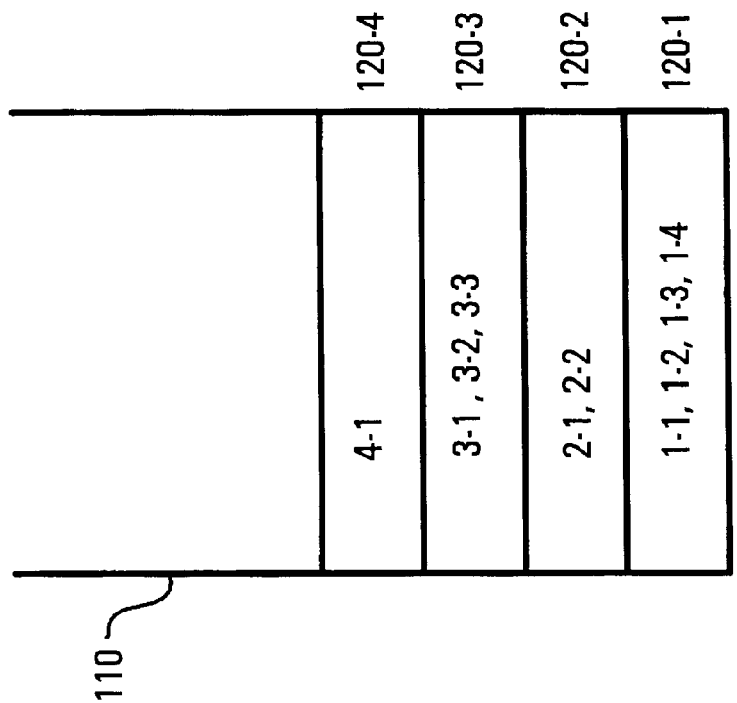
FIG. 2A shows the queue in FIG. 1 storing exemplary data.

Referring to FIG. 2A for an illustration of how transaction data is stored in queue 110. FIG. 2 shows queue 110 having data for four transactions 1, 2, 3, and 4 in locations 120-1, 120-2, 120-3, and 120-4, respectively. Transaction 1 has four data pieces 1—1, 1-2, 1-3, and 1-4; transaction 2 has two data pieces 2-1 and 2—2; transaction 3 has three data pieces 3-1, 3-2, and 3—3; and transaction 4 has one data pieces 4-1. The first data pieces for transactions 1, 2, 3, and 4 are 1—1, 2-1, 3-1, and 4-1, respectively. In this example, queue 110 receives the first data pieces for the four transactions in the order of 1—1, 2-1, 31, and 4-1, and these data pieces are therefore stored in the order of locations 120-1, 120-2, 120-3, and 120-4, respectively. With respect to each transaction, queue 110 receives the data in the order of 1—1, 1-2, 1-3, and 1-4 for transaction 1; in the order of 2-1 and 2—2 for transaction 2; and in the order of 3-1, 3-2, and 3—3 for transaction 3. As these data pieces are received, they are stored accordingly, e.g., data pieces 1-2, 1-3, and 1-4 are stored in the same location with data piece 1—1; data piece 2—2 is stored in the same location with data piece 2-1; and data pieces 3-2 and 3—3 are stored in the same location as data piece 3-1, etc.

Illustration of How Data May Arrive at Queue 110

FIG. 2B shows an example of how the data in FIG. 2A may arrive at queue 110, in accordance with one embodiment. This example uses a two-channel system, e.g., a channel A and a channel B. Further, without data stalling, data pieces arrive in alternating channels A and B. Initially, transaction 1 is associated with channel A, and data pieces 11, 1-2, 1-3, and 1-4 arrive in cycles 1, 3, 5, and 7, respectively. Transaction 2 is associated with channel B, and data pieces 2-1 and 2—2 arrive in cycles 2 and 4, respectively. Transaction 3 is associated with channel A, and data pieces 3-1, 3-2, and 3—3 arrive in cycles 9, 11, and 14, respectively. Transaction 4 is associated with channel B, and the sole data piece 4-1 arrives in cycle 10.

Because transaction 1 and transaction 3 are associated with channel A, all data pieces of transaction 1 and transaction 3 arrive in channel A. Similarly, because transaction 2 and transaction 4 are associated with channel B, all data pieces of transaction 2 and transaction 4 arrive in channel B.

Channel A ends its association with transaction 1 after cycle 7, and is thus available for use starting cycle 9. Channel B ends its association with transaction 2 after cycle 4, and thus is available for use starting cycle 6. However, in this example, no data arrives in cycle 6 or cycle 8. Transactions 3 and 4 start in cycle 9 and 10, and are thus associated with the then available channels A and B, respectively. Channel B also ends its association with transaction 4 after cycle 10, and is thus available for use starting cycle 12. However, as another example, no new transaction arrives in cycle 12.

In cycle 13, data piece 3—3 for transaction 3 is stalled. Channel A to be carrying this data piece 3—3 thus remains active in the next cycle 14. In this example, data piece 33 arrives in cycle 14. However, for illustration purposes, if data piece 3—3 is stalled for an additional cycle, then channel A remains active for an additional cycle, e.g., cycle 15. Similarly, if data piece 3—3 is stalled for two, instead of one additional, cycles, then channel A remains active for two additional cycles, e.g., cycles 15 and 16, etc.

Write Operations

Write pointers WP control logic to determine appropriate locations of queue 110 into which data is written. A write pointer can stay, i.e., point to the same location to which it has been pointing, increment, i.e., move up one location in queue 110, or jump, i.e., move up more than one location. For illustrative purposes, a write pointer associated with an active channel is referred to as an active pointer while a write pointer associated with an inactive channel is referred to as an inactive pointer. In one embodiment, only one of the two pointers WP is active in a cycle. For example, if pointer WP-1 is active, then pointer WP-2 is inactive, and, similarly, if pointer WP-1 is inactive, then pointer WP-2 is active, etc. A write pointer starts tracking a transaction when that pointer points to the first data piece of that transaction, and ends tracking that transaction when the transaction is complete, i.e., all data pieces for that transaction have been received and stored in a location of queue 110. For example, if pointer WP-1 is pointing to location 110-1 and is available to track a new transaction when data piece 1—1 for transaction 1 arrives, then pointer WP-1 tracks this transaction 1 until all data pieces for transaction 1 are stored in this location 110-1, after which, pointer WP-1 is available to track a new transaction.

In one embodiment, system 100 operates in accordance with the following rules:
Reset If queue 110 is reset, both pointers WP-1 and WP-2 are also reset, e.g., pointing to the lowest location 120-1.
No Data is Received If no transaction data arrives in a cycle, both pointers WP-1 and WP-2 remain pointing to the same locations to which they are pointing.

In the following operations, assume a data piece arrives to be written into queue 110, i.e., there is no bypass. Further, unless specified, the data piece is not the last data of a transaction. In general, a pointer tracking a transaction remains pointing to the same location storing data for the transaction until the transaction is completely received.

Write Pointers are Equal

When pointers WP-1 and WP-2 are equal, both pointers are available to track a new transaction. During this time, each pointer alternately becomes active and inactive. When the first data piece of a new transaction arrives in a cycle, the data piece is written into the location pointed to by both pointers. The then active pointer starts tracking the transaction associated with that data piece, and remains tracking that transaction until the transaction is complete. The inactive pointer is incremented by one to track a new transaction. This results in the situation in which two pointers are not equal, and one pointer is available for a new transaction and one pointer is tracking an in-progress transaction.

However, if the data is a one-piece data transaction, e.g., the first data piece is also the last data piece, the data piece is written into the location pointed to by both pointers and both pointers are incremented by one, and are available to track a new transaction. Both pointers thus remain equal.
Two Pointers are Not Equal In this situation, at least one pointer is tracking a transaction.

One Pointer is Tracking an In-Progress Transaction and One Pointer is Available to Track a New Transaction In one embodiment, the available pointer is higher while the tracking-transaction pointer is lower. Note that, in this embodiment, the tracking-transaction pointer is not allowed to be higher.

If the data is received for a new transaction, then the data is written into the location pointed to by the available pointer, and this available pointer starts tracking this new transaction until the transaction is complete. Consequently, there are now two transactions in progress. However, if the data is a one-piece data transaction, then the transaction is also complete, the "available" pointer is also incremented by one. This case reverts to the situation in which there is only one transaction in progress, e.g., only one pointer is tracking a transaction, and the other pointer is available to track a new transaction.

However, if the data is for the transaction in progress, then the data is written into the location pointed to by the tracking-transaction pointer, and this tracking-transaction pointer remains pointing to the same location until the transaction is complete. If the data is also the last data piece, i.e., the transaction is complete, then the tracking-transaction pointer jumps to the location pointed to by the "available" pointer. This reverts to the situation in which two pointers are equal.

Each Write Pointer is Tracking a Transaction

The received data is written into the location corresponding the transaction of the data. The pointers remain pointing to the same location until the transaction tracked by a pointer is complete. When the transaction corresponding to the higher pointer is complete, this higher pointer is incremented by one. However, when the transaction corresponding to the lower pointer is complete, this lower pointer jumps to the location pointed to by the higher pointer plus one. Both situations revert to the case in which one pointer is available for a new transaction and one pointer is tracking an in-progress transaction.

By using the above rules and techniques for writing data into queue 110, no additional pointer is needed to keep track of the next available location for writing because this next available location can be determined based on the applicable conditions described above.

Exemplary Steps in Writing Data Pieces

Figure 3:
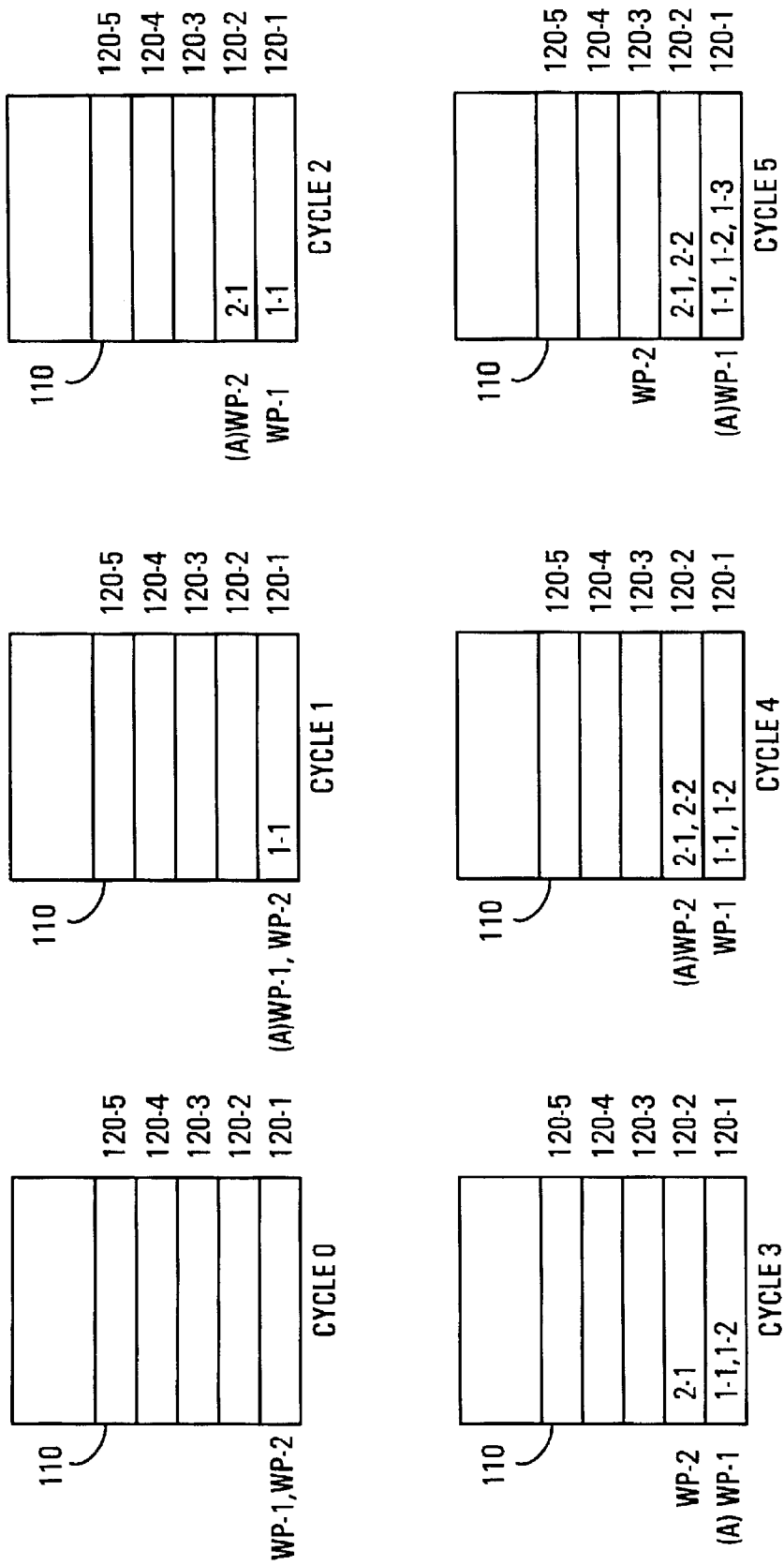
FIG. 3 shows the queue in FIG. 1 storing data through various steps, in accordance with one embodiment.
Figure 3:
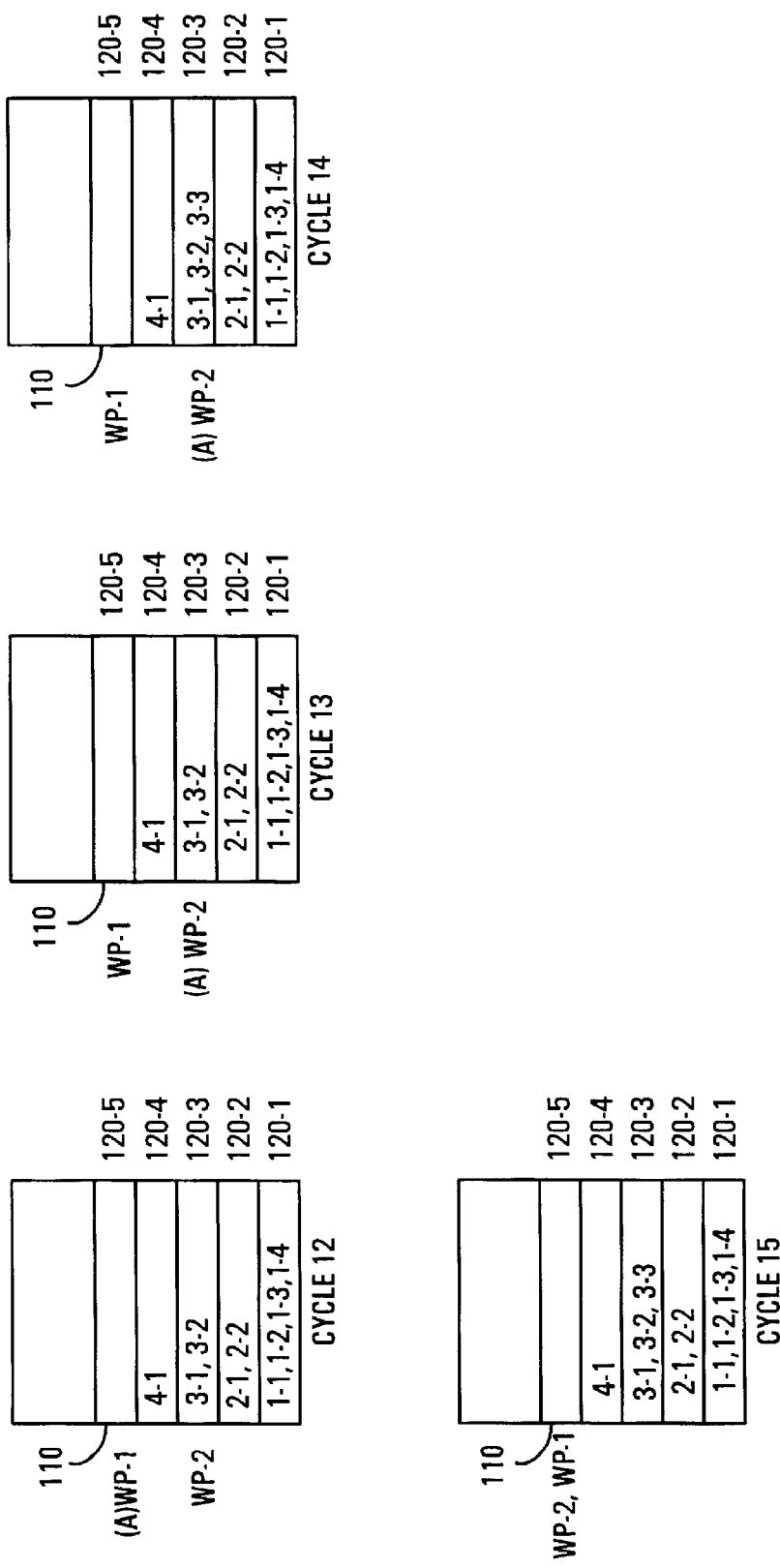

Referring to FIG. 3 for the illustration of how data pieces in FIG. 2A are stored in queue 110 through various steps, assuming these data pieces arrive at queue 110 in the order in FIG. 2B, in accordance with one embodiment. Each drawing in this FIG. 3 corresponds to a cycle.

Initially, at cycle 0, queue 110 is empty, and both pointers WP-1 and WP-2 point to the same location 120-1. While waiting for the data to arrive, each pointer is alternately active, e.g., it is active in a cycle and inactive in the next cycle. Further, while one pointer is active, the other pointer is inactive, and vice versa.

For illustrative purposes, in cycle 1, pointer WP-1 is active while pointer WP-2 is inactive, and data piece 1—1 of transaction 1 arrives. Data piece 1—1 is then written into location 120-1. Because pointer WP-1 is active, it is now tracking transaction 1. Further, because data piece 1—1 is not the last data of transaction 1, pointer WP-1 remains tracking transaction 1, e.g., remains pointing to location 120-1. Pointer WP-2 is incremented by one location, e.g., to location 120-2, as shown in cycle 2. Pointer WP-2 is to track a new transaction as this new transaction arrives. Because in the example of FIG. 2B, transaction 1 is associated with channel A, pointer WP-1 is now associated with channel A. Pointer WP-2 and pointer WP-1 then become active and inactive, respectively, for use in cycle 2.

In cycle 2, data piece 2-1 of transaction 2 arrives. Because pointer WP-2 is active, and is available for use, it starts tracking transaction 2. Data piece 2-1 is thus written in location 120-2 pointed to by pointer WP-2. Because transaction 2 is associated with channel B, pointer WP-2 is now associated with channel B. As both transaction 1 and transaction 2 are not complete, both pointers WP-1 and WP-1 remain pointing to the same location 120-1 and location 120-2, respectively. Pointer WP-1 and pointer WP-2 then become active and inactive, respectively, for use in cycle 3.

In cycle 3, data piece 1-2 arrives and is written into location 120-1 pointed to by the active pointer WP-1. Because data piece 1-2 is not the last data piece, pointer WP-1 remains pointing to the same location 120-1. Pointer WP-2 and pointer WP-1 then become active and inactive, respectively, for use in cycle 4.

In cycle 4, data piece 2—2 arrives and is written into location 120-2 pointed to by the active pointer WP-2. Because data piece 2—2 is the last data piece of transaction 2, transaction 2 is complete. Further, because pointer WP-2 is higher, it is incremented by one, e.g., to location 120-3, as shown in cycle 5. Pointer WP-1 and pointer WP-2 then become active and inactive, respectively, for use in cycle 5.

In cycle 5, data piece 1-3 arrives and is written into location 120-1 pointed to by the active pointer WP-1. Because data piece 1-3 is not the last data piece, pointer WP-1 remains pointing to the same location 120-1. Pointer WP-2 and pointer WP-1 become active and inactive, respectively, for use in cycle 6.

In cycle 6, as illustrated in FIG. 2B, no data arrives, and both pointers WP-1 and WP-2 thus remain pointing to the same locations 120-1 and 120-3, respectively. However, pointer WP-1 and pointer WP-2 then become active and inactive, respectively, for use in cycle 7.

In cycle 7, data piece 1-4 arrives and is written in location 120-1 pointed to by the active pointer WP-1. Because data piece 1-4 is the last data for transaction 1, transaction 1 is complete. Further, because pointer WP-1 is lower and write pointer WP-2 is not tracking a transaction, write pointer WP-1 jumps to the location pointed to by pointer WP-2, e.g., location 120-3, as shown in cycle 8.

After cycle 7, because both write pointers WP-1 and WP-2 are available, in one embodiment, they alternately become active and inactive. In cycle 8, because no data arrives, pointers WP-1 and WP-2 remain pointing to the same location 120-3.

In cycle 9, data piece 3-1 of transaction 3 arrives, and, in one embodiment, because both channels A and B are available, this data piece 3-1 can arrive in either channel A or channel B and either pointer WP-1 or WP-2 can be active, i.e., can be used to track transaction 3. For illustration purposes, data piece 3-1 arrives in channel A and write pointer WP-2 is active and thus starts tracking transaction 3. Data piece 3-1 is thus written into location 120-3. Because data piece 3-1 is not the last data of transaction 3, active pointer WP-2 remains pointing to location 120-3 to continue tracking transaction 3. However, inactive pointer WP-1 is incremented by one as shown in cycle 10 and is available to track a new transaction as it arrives. Pointers WP-1 and WP-2 then become active and inactive, respectively, for use in cycle 10.

In cycle 10, data piece 4-1 arrives and is written into location 120-4 pointed to by the active pointer WP-1. Because data piece 4-1 is also the last data piece of transaction 4, and pointer WP-1 is higher, pointer WP-1 is incremented by one to location 120-5 as shown in cycle 11. Pointers WP-2 and WP-1 then become active and inactive, respectively, for use in cycle 11.

In cycle 11, data piece 3-2 arrives and is written into location 120-3 pointed to by the active pointer WP-2. Because data piece 3-2 is not the last data piece of transaction 3, pointer WP-2 remains pointing to the same location 120-3. Pointer WP-1 and pointer WP-2 then become active and inactive, respectively, for use in cycle 12.

In cycle 12, for illustration purposes, because no data arrives, both pointers WP-1 and WP-2 remain pointing to the same location 120-5 and 120-3, respectively. However, pointers WP-2 and WP-1 become active and inactively, respectively, for use in cycle 13.

In cycle 13, data piece 3—3 may arrive in channel A. However, for illustration purposes, data piece 3—3 is stalled. In one embodiment, since data piece 3—3 is stalled, channel A, and thus write pointer WP-2, remains active.

In cycle 14, data piece 3—3 arrives in channel A and is written into location 120-3 pointed to by the active pointer WP-2. Because data 3—3 is the last data piece of transaction 3, and pointer WP-2 is lower, and pointer WP-1 is not tracking a transaction, pointer WP-2 jumps to location 110-5 pointed to by pointer WP-1, as shown in cycle 15.

In the above example, in cycles 0, 8, and 15, because two pointers WP-1 and WP-2 are both available to track a new transaction, they point to the same location, e.g., locations 120-1, 120-3, and 120-5.

Bypass Operations

In one embodiment, data of a transaction can bypass queue 110, e.g., the data is not written into queue 110 but is loaded directly to one of the registers 130, if it is available for storing data. In one embodiment, the data is bypassed if queue 110 is empty and a one-piece data transaction is received. In general, when queue 110 is empty, read pointer RP is equal to the two write pointers WP-1 and WP-2. After a bypass, read pointer RP and two write pointers WP remain pointing to the same location to which they are pointing.

Read Operations

Read pointer RP points to a location from which the data is read. In one embodiment, because reading is in the order of the received transactions, read pointer RP is not allowed to pass the lower write pointer WP. That is, the location pointed to by read pointer RP is equal to or lower than the location pointed to by the lower write pointer. If two write pointers are equal, the location pointed to by read pointer RP is equal to or lower than the location pointed to by both write pointers.

In one embodiment, the data is read from queue 110 as a single event on the same cycle that the first element in the transaction is read, and in the order the first elements of the transactions were written in queue 110. Alternatively, the data is read in the order of a lower location to a higher location. In the example of FIG. 2A, the data is read in the order of location 1, location 2, location 3, and location 4 for transaction 1, transaction 2, transaction 3, and transaction 4, respectively. After the read, read pointer RP is incremented by one, and the location from which the data is read is available for storing new data. Initially or at reset, read pointer RP points to the lowest location, e.g., location 120-1.

In the above example, two write pointers are used and correspond to two data channels. However, the invention is not limited to a two-pointer system, but is applicable to a system with various write pointers in which a write pointer corresponds to a channel. A write pointer, where appropriate, tracks a transaction. For example, if there are five channels, then there are five write pointers, each of which may track a transaction in the process of being written in queue 110. Similarly, if there are M channels, then there are M corresponding write pointers, each of which may track a transactions in the process of being written into queue 110. A pointer tracks a transaction until the transaction is completely received.

Generally, all pointers available to track a new transaction are equal, and, in a cycle, one pointer is active while the rest of the available pointer is inactive. When a new transaction arrives, this active available pointer starts tracking the arrived transaction, and all the available inactive pointers increment by one. However, if the transaction has only one data piece, then, all available pointers increment by one. Further, a pointer available to track a new transaction is higher than a pointer tracking an in-progress transaction. A pointer tracking a transaction does not change position until the transaction is complete.

When at least one pointer is tracking a transaction, in one embodiment, the highest pointer that tracks a transaction is used as a reference. If the transaction corresponding to this highest write pointer is complete, then this highest write pointer increments by one. However, a pointer that is not this highest write pointer jumps to this highest write pointer plus one.

Computer System Overview

Figure 4:
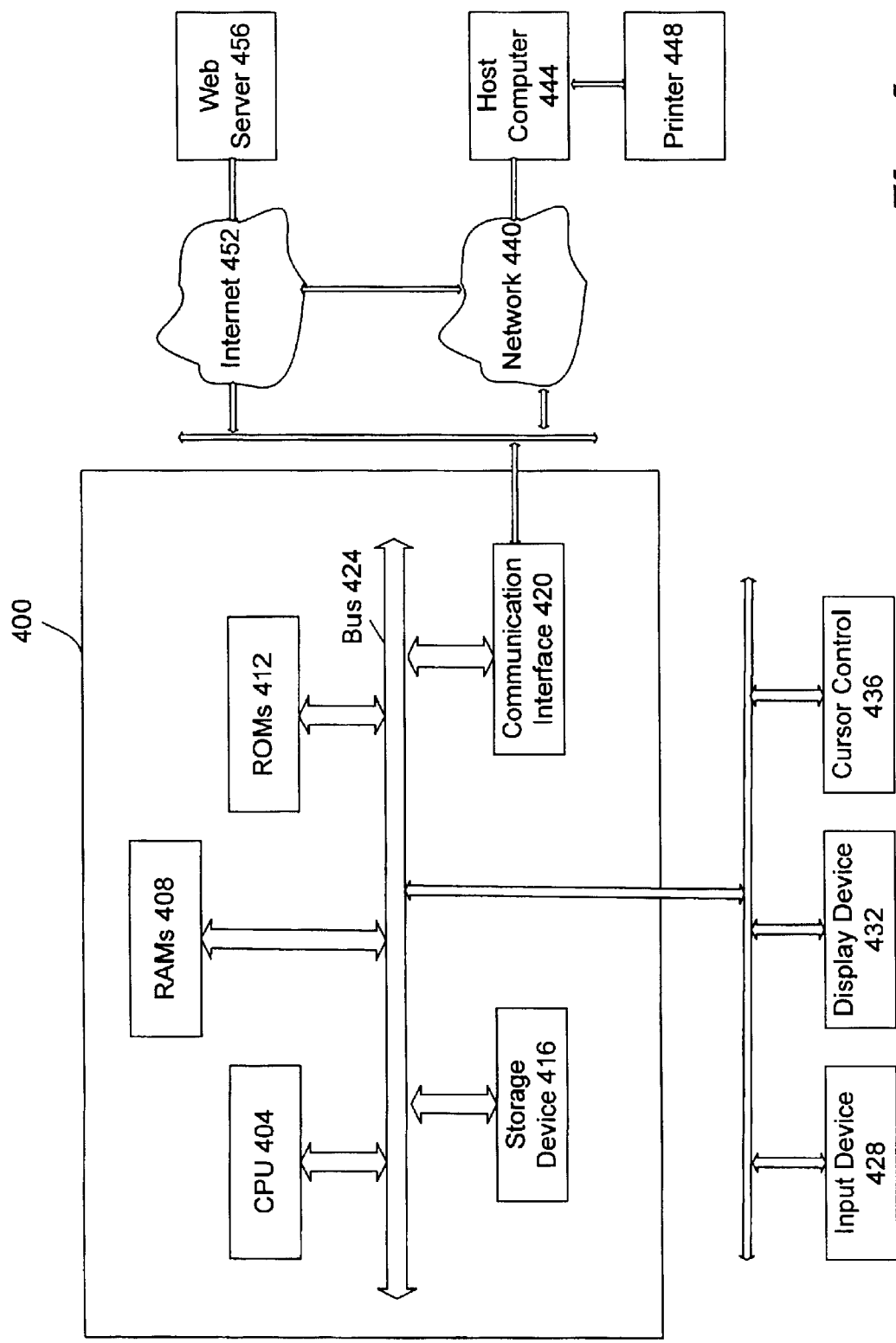
FIG. 4 shows a computer upon which embodiments of the invention may be implemented.

FIG. 4 is a block diagram showing a computer system 400 upon which an embodiment of the invention may be implemented. For example, computer system 400 may be implemented to include system 100, to implement and/or perform the techniques disclosed herein, etc. In one embodiment, computer system 400 includes a processor 404, random access memories (RAMs) 408, read-only memories (ROMs) 412, a storage device 416, and a communication interface 420, all of which are connected to a bus 424.

Processor 404 controls logic, processes information, and coordinates activities within computer system 400. In one embodiment, processor 404 executes instructions stored in RAMs 408 and ROMs 412, by, for example, coordinating the movement of data from input device 428 to display device 432.

RAMs 408, usually being referred to as main memory, temporarily store information and instructions to be executed by processor 404. Information in RAMs 408 may be obtained from input device 428 or generated by processor 404 as part of the algorithmic processes required by the instructions that are executed by processor 404.

ROMs 412 store information and instructions that, once written in a ROM chip, are read-only and are not modified or removed. In one embodiment, ROMs 412 store commands for configurations and initial operations of computer system 400.

Storage device 416, such as floppy disks, disk drives, or tape drives, durably stores information for used by computer system 400.

Communication interface 420 enables computer system 400 to interface with other computers or devices. Communication interface 420 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 420 may also allow wireless communications.

Bus 424 can be any communication mechanism for communicating information for use by computer system 400. In the example of FIG. 4, bus 424 is a media for transferring data between processor 404, RAMs 408, ROMs 412, storage device 416, communication interface 420, etc.

Computer system 400 is typically coupled to an input device 428, a display device 432, and a cursor control 436. Input device 428, such as a keyboard including alphanumeric and other keys, communicates information and commands to processor 404. Display device 432, such as a cathode ray tube (CRT), displays information to users of computer system 400. Cursor control 436, such as a mouse, a trackball, or cursor direction keys, communicates direction information and commands to processor 404 and controls cursor movement on display device 432.

Computer system 400 may communicate with other computers or devices through one or more networks. For example, computer system 400, using communication interface 420, communicates through a network 440 to another computer 444 connected to a printer 448, or through the world wide web 452 to a server 456. The world wide web 452 is commonly referred to as the "Internet." Alternatively, computer system 400 may access the Internet 452 via network 440.

Computer system 400 may be used to implement the techniques described above. In various embodiments, processor 404 performs the steps of the techniques by executing instructions brought to RAMs 408. In alternative embodiments, hard-wired circuitry may be used in place of or in combination with software instructions to implement the described techniques. Consequently, embodiments of the invention are not limited to any one or a combination of software, hardware, or circuitry.

Instructions executed by processor 404 may be stored in and carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge.

Computer-readable media may also be coaxial cables, copper wire, fiber optics, acoustic, or light waves, etc. As an example, the instructions to be executed by processor 404 are in the form of one or more software programs and are initially stored in a CD-ROM being interfaced with computer system 400 via bus 424. Computer system 400 loads these instructions in RAMs 408, executes some instructions, and sends some instructions via communication interface 420, a modem, and a telephone line to a network, e.g. network 440, the Internet 452, etc. A remote computer, receiving data through a network cable, executes the received instructions and sends the data to computer system 400 to be stored in storage device 416.

In the foregoing specification, the invention has been described with reference to specific embodiments thereof. However, it will be evident that various modifications and changes may be made thereto without departing from the broader spirit and scope of the invention. The techniques disclosed herein may be implemented as a method, an apparatus, a system, a device, or their equivalences, a computer-readable medium, etc. Accordingly, the specification and drawings are to be regarded as illustrative rather than as restrictive.

What is claimed is:

1. A method for managing data in a queue having a plurality of locations, comprising the steps of:
   receiving the data of a first transaction time interleave with the data of a second transaction;
   using two identifiers to identify a first location; a first identifier being active to be associated with the first transaction when it is received while a second identifier being inactive;
   storing a first data piece of the first transaction to the first location;
   using the first identifier being then active to identify the first location for storing data pieces of the first transaction until all data pieces of the first transaction are stored in the first location;
   using the second identifier to identify a second location being one location higher than the first location.

2. The method of claim 1 wherein if the first data piece of the first transaction is also the last data piece of the first transaction, then using the first identifier to identify the second location.

3. The method of claim 1, while no data has been stored to the first location, alternately selecting the first identifier and the second identifier to be associated with the first transaction.

4. The method of claim 1 wherein the first transaction being associated with a first data channel carrying the data for the first traction and the second transaction being associated with a second data channel carrying the data for the second transaction.

5. A method for managing data in a queue having a plurality of locations, comprising the steps of:
   receiving the data of a first transaction time interleave with the data of a second transaction;
   using two identifiers to identify a first location; a first identifier being active to be associated with the first transaction when it is received while a second identifier being inactive;
   receiving a first data piece of the first transaction being also the last data piece of the first transaction;
   if a register normally used for storing data previously stored in the queue is available for storing data, then bypassing the queue and storing the first data piece in the register; and
   remaining using the first identifier and the second identifier to identify the first location.

6. A method for managing data in a queue having a plurality of locations, comprising the steps of:
   receiving the data of a first transaction time interleave with the data of a second transaction;
   using a first identifier to identify a first location for storing data pieces for the first transaction until all data pieces of the first transactions are stored in this first location; wherein the first location having stored at least one data piece for the first transaction;
   using a second identifier to identify a second location available for storing data for a second transaction as it arrives; wherein the second location being higher than the first location.

7. The method of claim 6 wherein, upon all data pieces of the first transaction are stored in the first location, using the first identifier to identify the location identified by the second identifier.

8. The method of claim 6 further comprising the steps of:
   storing a first data piece of the second data transaction to the second location; and
   using the second identifier to identify the second location for storing data pieces of the second transaction until all data pieces of the second transaction are stored in the second location.

9. The method of claim 8 wherein if the first data piece of the second transaction is also the last data piece of the second transaction, then using the second identifier to identify a third location being one location higher than the second location.

10. The method of claim 6 wherein the first transaction being associated with a first data channel carrying the data for the first transaction and the second transaction being associated with a second data channel carrying the data for the second transaction.

11. A method for managing data in a queue having a plurality of locations, comprising the steps of:
    receiving the data of a first transaction time interleave with the data of a second transaction;
    using a first identifier to identify a first location storing data for a first transaction until all data pieces of the first transaction are stored in the first location; wherein the first location having stored at least one data piece of the first transaction;
    using a second identifier to identify a second location storing data for a second transaction until all data pieces of the second transaction are stored in the second location; wherein the second location having stored at least one data piece for the second transaction;
    wherein upon all data pieces of either the first transaction or the second transaction are stored in its corresponding location, moving the identifier identifying the corresponding location to identify a third location identified by the relative position of the first location and the second location.

12. The method of claim 11 wherein upon all data pieces of the first transaction are stored in the first location, if the first location is higher than the second location, then moving the first identifier to identify a third location being one location higher than the first location.

13. The method of claim 11 wherein upon all data pieces of the first transaction are stored in the first location, if the first location is lower than the second location, then moving the first identifier to identify a third location being one location higher than the second location.

14. A method for managing data in a queue having a plurality of locations, comprising the steps of:
receiving the data of a first transaction time interleave with the data of a second transaction;
providing a plurality of identifiers each of which is used to track a new transaction; a first identifier being active while the rest of the identifiers being inactive;
using all identifiers available to track the new transaction to identify a same first location for storing data for the new transaction; and
when a first data piece of a first new transaction is received, storing the first data piece in the first location, using the active identifier to track the first new transaction and to remain identifying the first location; the first new transaction thereby becoming an in-progress transaction; and
allowing all identifiers available to track a second new transaction to identify a second location higher than the first location.

15. The method of claim 14 wherein the order of receiving first data pieces of transactions constitutes the order of locations into which the data of the transactions are written.

16. The method of claim 14 wherein the identifier tracking the in-progress transaction remains identifying the first location for storing data of the in-progress transaction until all data pieces of the in-progress transaction are written in the first location, at which time the identifier tracking the in-progress transaction moves to identify the second location.

17. A method for managing data in a queue having a plurality of locations, comprising the steps of:
identifying a transaction having at least one data piece stored in a location as an in-progress transaction;
allowing at least one location to correspond to an in-progress transaction;
including a first location corresponding to a first in-progress transaction, the first location being highest as compared to other locations corresponding to other in-progress transactions;
when a data piece for an in-progress transaction is received,
storing that data piece in the same location of the in-progress transaction identified by a corresponding identifier;
if the data piece is not the last data piece, then the corresponding identifier remains identifying the same location;
else if the data piece is also the last data piece, then
if the data piece is for the first in-progress transaction, a first identifier identifying the first location is changed to identify a second location one location higher than the first location;
if the data piece is not for the first in-progress transaction, then the identifier corresponding to the transaction of the data piece is changed to identify a location one location higher than the location identified by the first identifier.

18. A queue comprising:
a plurality of locations; and
two write identifiers for identifying a location into which a data piece of a transaction is written; each identifier alternately becomes active to be associated with a first transaction when it arrives; wherein
when a first data piece of a first transaction arrives,
store the first data piece to a first location identified by both identifiers,
a first identifier being then active identifies the first location for storing subsequent data pieces of the first transaction until all data pieces of the first transaction are stored in the first location;
the second identifier identifies a second location being one location higher than the first location;
if the first data piece is also the last data piece of the first transaction, then the first identifier changes to identify the second location.

19. A queue connected to a register, comprising:
a plurality of locations; and
two write identifiers for identifying a location into which a data piece of a transaction is written;
wherein if both identifiers identify a same first location, and if a first data piece is also a last data piece of a first transaction, then store the first data piece into the register, and both identifiers continue to identify the first location.

20. A queue comprising:
a plurality of locations; and
two write identifiers for identifying a location into which a data piece of a transaction is stored;
wherein if a first identifier identifies a first location having at least one data piece of a first transaction, and a second identifier identifies an empty second location, then
if the last data piece of the first transaction is written into the first location, then the first identifier changes to identify the empty location identified by the second identifier,
else storing a first data piece of a second transaction into the empty location and a second identifier identifies the second location until the last data piece of the second transaction is stored into the second location, and if the first data piece is also the last data piece of the second transaction then the second identifier changes to identify a third location.

21. A queue comprising:
a plurality of locations; and
two write identifiers for identifying a location into which a data piece of a transaction is written;
wherein if a first identifier identifies a first location having at least one data piece of a first transaction and a second identifier identifies a second location having at least one data piece of a second transaction, then
the first location stores all data pieces of the first transaction,
the second location stores all data pieces of the second transaction,
if, upon all data pieces of the first transaction are stored in the first location, and if the first location is higher than the second location, then the first identifier changes to identify a third location one location higher than the first location,
else if, upon all data pieces of the second transaction are stored in the second location, and if the second location is lower than the first location, then the second identifier moves to identify a fourth location one location higher than the first location.

* * * * *